United States Patent
Zhao et al.

(10) Patent No.: US 10,152,882 B2
(45) Date of Patent: Dec. 11, 2018

(54) HOST VEHICLE OPERATION USING REMOTE VEHICLE INTENTION PREDICTION

(71) Applicant: Nissan North America, Inc., Franklin, TN (US)

(72) Inventors: Yue Zhao, Palo Alto, CA (US); Ali Mortazavi, Walnut Creek, CA (US)

(73) Assignee: Nissan North America, Inc., Franklin, TN (US)

( * ) Notice: Subject to any disclaimer, the term of this patent is extended or adjusted under 35 U.S.C. 154(b) by 103 days.

(21) Appl. No.: 14/954,083

(22) Filed: Nov. 30, 2015

(65) Prior Publication Data

US 2017/0154529 A1 Jun. 1, 2017

(51) Int. Cl.
    *G08G 1/0968* (2006.01)
    *G05D 1/02* (2006.01)
    (Continued)

(52) U.S. Cl.
    CPC ........... *G08G 1/0145* (2013.01); *B60W 30/12* (2013.01); *G08G 1/0112* (2013.01);
    (Continued)

(58) Field of Classification Search
    CPC ........... G08G 1/096811; G08G 1/0125; G08G 1/0145; G08G 1/0112; B60W 30/12; B60W 2600/00; G05D 1/0276; G05D 2201/0213
    See application file for complete search history.

(56) References Cited

U.S. PATENT DOCUMENTS 7,102,496 B1 * 9/2006 Ernst, Jr. ................ G08G 1/164
    180/167
7,796,081 B2 * 9/2010 Breed .................. B60N 2/2863
    340/435

(Continued)

FOREIGN PATENT DOCUMENTS

| JP | 2007137248 A | 6/2007 |
|---|---|---|
| JP | 2011192177 A | 9/2011 |
| JP | 2013152540 A | 8/2013 |

OTHER PUBLICATIONS

Hamlet et al., "Joint Belief and Intent Prediction for Collision Avoidance in Autonomous Vehicles", 2015 Florida Conference on Recent Advances in Robotics, FCRAR 2015 (Melbourne, FL, May 14-15, 2015), 5 pp.

(Continued)

*Primary Examiner* — Jelani A Smith
*Assistant Examiner* — Majdi Alsomiri
(74) *Attorney, Agent, or Firm* — Young Basile Hanlon & MacFarlane, P.C.

(57) ABSTRACT

A host vehicle receives remote vehicle spatial state information for a remote vehicle and identifies vehicle transportation network information representing a portion of a transportation network based on that information. At least one initial probability value is generated based on comparing the spatial state information and the transportation network information at an initial time point, each initial probability value indicating a likelihood that the remote vehicle is following a lane within the transportation network. A deviation between adjacent values for the spatial state information relative to the transportation network information is generated for a plurality of time points. For each single lane and deviation, the likelihood that the remote vehicle is following the lane using a new probability value based on the deviation is updated, a trajectory using the (Continued)

updated likelihood is generated, and the host vehicle traverses the transportation network using the transportation network information and trajectory.

21 Claims, 11 Drawing Sheets

(51) Int. Cl.
- *G08G 1/01* (2006.01)
- *B60W 30/12* (2006.01)
- *G08G 1/07* (2006.01)
- *G08G 1/0967* (2006.01)
- *G08G 1/16* (2006.01)

(52) U.S. Cl.
CPC ......... *G08G 1/0133* (2013.01); *G08G 1/0141* (2013.01); *G08G 1/07* (2013.01); *G08G 1/096725* (2013.01); *G08G 1/096775* (2013.01); *G08G 1/096783* (2013.01); *G08G 1/096791* (2013.01); *G08G 1/161* (2013.01); *G08G 1/164* (2013.01); *B60W 2600/00* (2013.01)

(56) References Cited

U.S. PATENT DOCUMENTS

| | | | | |
|---|---|---|---|---|
| 9,150,220 | B2* | 10/2015 | Clarke | B60W 30/00 |
| 9,165,477 | B2* | 10/2015 | Wilson | G09B 19/10 |
| 9,227,635 | B1* | 1/2016 | Takamatsu | B62D 5/0466 |
| 9,443,153 | B1* | 9/2016 | Gupta | G06F 17/3028 |
| 2002/0065603 | A1* | 5/2002 | Watanabe | G01C 21/30 |
| | | | | 701/446 |
| 2005/0015203 | A1* | 1/2005 | Nishira | G08G 1/167 |
| | | | | 701/301 |
| 2008/0150786 | A1* | 6/2008 | Breed | B60N 2/2863 |
| | | | | 342/53 |
| 2009/0140887 | A1* | 6/2009 | Breed | G01C 21/165 |
| | | | | 340/990 |
| 2012/0150437 | A1* | 6/2012 | Zeng | B60W 30/12 |
| | | | | 701/456 |
| 2013/0054106 | A1* | 2/2013 | Schmudderich | B60W 30/0956 |
| | | | | 701/96 |
| 2013/0099911 | A1* | 4/2013 | Mudalige | G08G 1/163 |
| | | | | 340/438 |
| 2013/0151058 | A1* | 6/2013 | Zagorski | B60W 30/09 |
| | | | | 701/23 |
| 2013/0321615 | A1* | 12/2013 | Schofield | B60Q 1/346 |
| | | | | 348/118 |
| 2013/0338868 | A1* | 12/2013 | Essame | B60W 30/18163 |
| | | | | 701/23 |
| 2014/0032108 | A1* | 1/2014 | Zeng | B60W 30/12 |
| | | | | 701/533 |
| 2014/0195093 | A1 | 7/2014 | Litkouhi et al. | |
| 2014/0214265 | A1* | 7/2014 | Ashton | G07C 5/0816 |
| | | | | 701/33.5 |
| 2015/0266455 | A1* | 9/2015 | Wilson | G08G 1/0112 |
| | | | | 701/93 |
| 2016/0031450 | A1* | 2/2016 | Wilson | G08G 1/0112 |
| | | | | 701/23 |

OTHER PUBLICATIONS

Wei et al., "A Robust Autonomous Freeway Driving Algorithm", 2009 IEEE Intelligent Vehicles Symposium (Jun. 2009), pp. 1015-1020.

Galceran et al., "Multipolicy Decision-Making for Autonomous Driving Via Changepoint-Based Behavior Prediction", Robotics: Science and Systems (Rome, Italy, Jul. 2015), 10 pp.

* cited by examiner

HOST VEHICLE OPERATION USING REMOTE VEHICLE INTENTION PREDICTION

TECHNICAL FIELD

This disclosure relates to vehicle operation, including routing and navigation.

BACKGROUND

A vehicle may include a control system that generates and maintains a route of travel and may control the vehicle to traverse the route of travel. For example, an autonomous vehicle may be controlled autonomously, without direct human intervention, to traverse a route of travel from an origin to a destination. With both autonomous vehicles and non-autonomous vehicles, it is desirable to know where remote vehicles will be along that route.

SUMMARY

Disclosed herein are aspects, features, elements, implementations, and embodiments of generating projected vehicle information for use in traversing a vehicle transportation network, allowing a host vehicle to operate using remote vehicle intention predictions.

An aspect of the disclosed embodiments is a method of generating projected vehicle information for use in traversing a vehicle transportation network. The method comprises receiving, at a host vehicle, remote vehicle spatial state information for a remote vehicle, identifying vehicle transportation network information representing a portion of the vehicle transportation network based on the remote vehicle spatial state information, generating, by a processor in response to instructions stored on a non-transitory computer readable medium, at least one initial probability value based on a comparison of the remote vehicle spatial state information and the vehicle transportation network information at an initial time point, each initial probability value indicating a likelihood that the remote vehicle is following a single lane within the vehicle transportation network information, generating, for a plurality of time points including the initial time point, a deviation of the remote vehicle between adjacent values for the remote vehicle spatial state information relative to the vehicle transportation network information, updating, for each single lane and for each deviation, the likelihood that the remote vehicle is following the single lane using a new probability value based on the deviation, generating, for the remote vehicle, a trajectory using the likelihood as updated, and traversing, by the host vehicle, the vehicle transportation network using the vehicle transportation network information and the trajectory for the remote vehicle.

Another aspect of the disclosed embodiments is a host vehicle that includes a processor configured to execute instructions stored on a non-transitory computer readable medium to receive remote vehicle spatial state information for a remote vehicle, identify vehicle transportation network information representing a portion of the vehicle transportation network based on the remote vehicle spatial state information, generate at least one initial probability value based on a comparison of the remote vehicle spatial state information and the vehicle transportation network information at an initial time point, each initial probability value indicating a likelihood that the remote vehicle is following a single lane within the vehicle transportation network information, generate, for a plurality of time points including the initial time point, a deviation of the remote vehicle between adjacent values for the remote vehicle spatial state information relative to the vehicle transportation network information, update, for each single lane and for each deviation, the likelihood that the remote vehicle is following the single lane using a new probability value based on the deviation, generate, for the remote vehicle, a trajectory using the likelihood as updated, and traverse, using a host vehicle, the vehicle transportation network using the vehicle transportation network information and the trajectory for the remote vehicle.

Yet another aspect of the disclosed embodiments is an apparatus including a non-transitory memory and a processor. The processor is configured to execute instructions stored on the non-transitory memory to receive remote vehicle spatial state information for a remote vehicle, identify vehicle transportation network information representing a portion of the vehicle transportation network based on the remote vehicle spatial state information, generate at least one initial probability value based on a comparison of the remote vehicle spatial state information and the vehicle transportation network information at an initial time point, each initial probability value indicating a likelihood that the remote vehicle is following a single lane within the vehicle transportation network information, generate, for a plurality of time points including the initial time point, a deviation of the remote vehicle between adjacent values for the remote vehicle spatial state information relative to the vehicle transportation network information, update, for each single lane and for each deviation, the likelihood that the remote vehicle is following the single lane using a new probability value based on the deviation, generate, for the remote vehicle, a trajectory using the likelihood as updated, and traverse, using a host vehicle, the vehicle transportation network using the vehicle transportation network information and the trajectory for the remote vehicle.

Variations in these and other aspects, features, elements, implementations and embodiments of the methods, apparatus, procedures and algorithms disclosed herein are described in further detail hereafter.

BRIEF DESCRIPTION OF THE DRAWINGS

The various aspects of the methods and apparatuses disclosed herein will become more apparent by referring to the examples provided in the following description and drawings in which.

DETAILED DESCRIPTION

Figure 1:
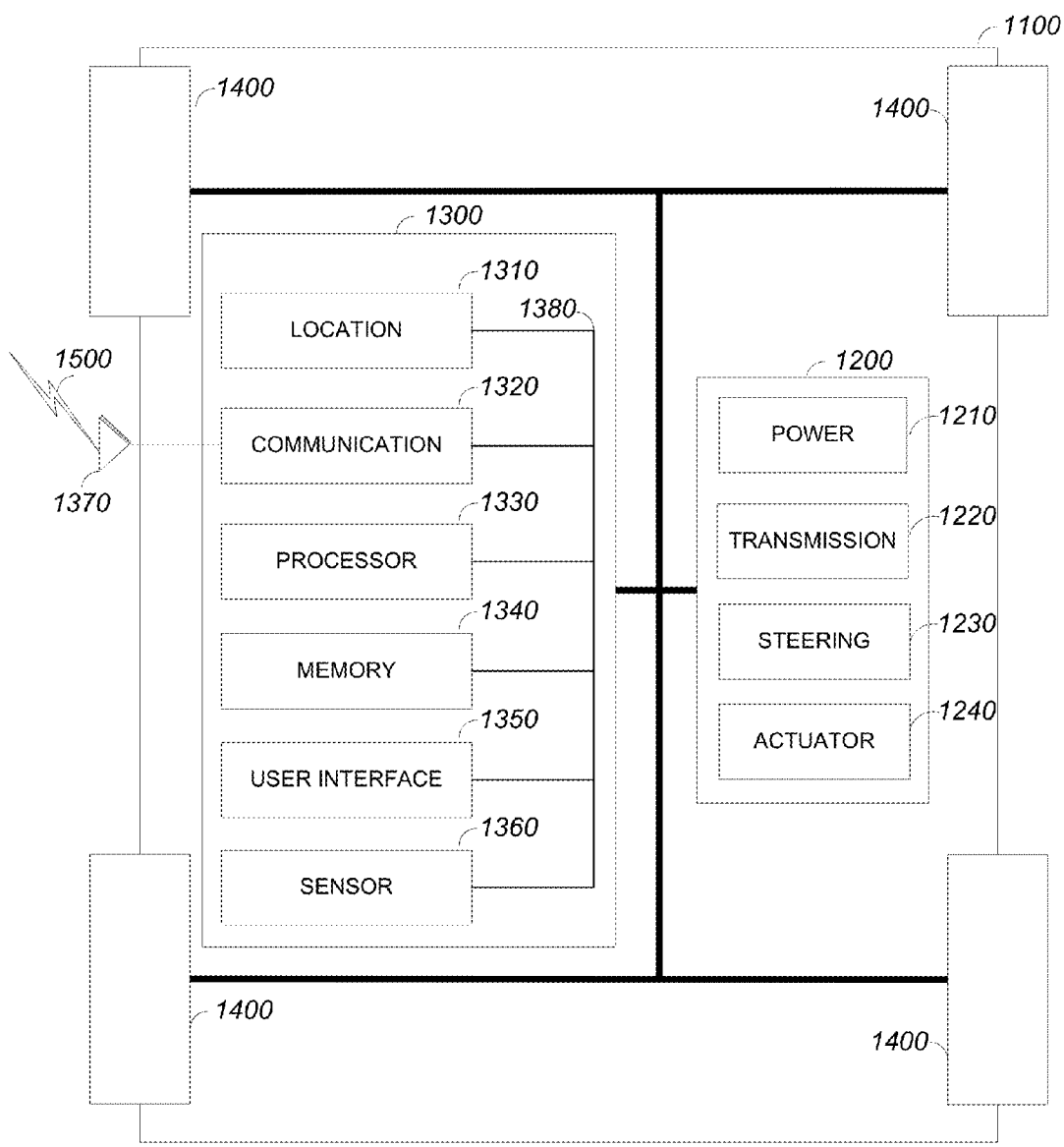
FIG. 1 is a diagram of an example of a portion of a vehicle in which the aspects, features and elements disclosed herein may be implemented.

A vehicle may travel from a point of origin to a destination in a vehicle transportation network. When the vehicle is traveling in the vehicle transportation network, the driving intention of other vehicles can be useful information. In a decision making layer of an autonomous vehicle or an infrastructure in the road, such a driving intention helps in making informed decisions. For example, the vehicle needs to be able to predict what other objects in a scene are going to do before making a driving plan (also called motion planning). As another example, an infrastructure can use predictions to make decisions about which of a number of vehicles entering an intersection has priority to pass through the intersection.

Looking at a vehicle's position, heading, acceleration, etc., using SONAR, RADAR, LIDAR, etc., works well for stationary objects. However, these systems, without more, lack the ability to discern driver/vehicle intent and cannot generate the trajectory of a moving vehicle. In contrast, the teachings herein can use this information and/or vehicle-to-vehicle (V2V) exchange of a basic safety message containing, e.g., location information, to predict vehicle driving intention. Details are described below in conjunction with a description of the environments in which the teachings herein may be implemented.

As used herein, the terminology "computer" or "computing device" includes any unit, or combination of units, capable of performing any method, or any portion or portions thereof, disclosed herein.

As used herein, the terminology "processor" indicates one or more processors, such as one or more special purpose processors, one or more digital signal processors, one or more microprocessors, one or more controllers, one or more microcontrollers, one or more application processors, one or more Application Specific Integrated Circuits, one or more Application Specific Standard Products; one or more Field Programmable Gate Arrays, any other type or combination of integrated circuits, one or more state machines, or any combination thereof.

As used herein, the terminology "memory" indicates any computer-usable or computer-readable medium or device that can tangibly contain, store, communicate, or transport any signal or information that may be used by or in connection with any processor. For example, a memory may be one or more read only memories (ROM), one or more random access memories (RAM), one or more registers, low power double data rate (LPDDR) memories, one or more cache memories, one or more semiconductor memory devices, one or more magnetic media, one or more optical media, one or more magneto-optical media, or any combination thereof.

As used herein, the terminology "instructions" may include directions or expressions for performing any method, or any portion or portions thereof, disclosed herein, and may be realized in hardware, software, or any combination thereof. For example, instructions may be implemented as information, such as a computer program, stored in memory that may be executed by a processor to perform any of the respective methods, algorithms, aspects, or combinations thereof, as described herein. In some embodiments, instructions, or a portion thereof, may be implemented as a special purpose processor, or circuitry, that may include specialized hardware for carrying out any of the methods, algorithms, aspects, or combinations thereof, as described herein. In some implementations, portions of the instructions may be distributed across multiple processors on a single device, on multiple devices, which may communicate directly or across a network such as a local area network, a wide area network, the Internet, or a combination thereof.

As used herein, the terminology "example", "embodiment", "implementation", "aspect", "feature" or "element" indicates serving as an example, instance or illustration. Unless expressly indicated, any example, embodiment, implementation, aspect, feature or element is independent of each other example, embodiment, implementation, aspect, feature or element and may be used in combination with any other example, embodiment, implementation, aspect, feature or element.

As used herein, the terminology "determine", "identify" and "generate", or any variations thereof, includes selecting, ascertaining, computing, looking up, receiving, determining, establishing, obtaining, or otherwise identifying or determining in any manner whatsoever using one or more of the devices shown and described herein.

As used herein, the terminology "or" is intended to mean an inclusive "or" rather than an exclusive "or". That is, unless specified otherwise, or clear from context, "X includes A or B" is intended to indicate any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form.

Further, for simplicity of explanation, although the figures and descriptions herein may include sequences or series of steps or stages, elements of the methods disclosed herein may occur in various orders or concurrently. Additionally, elements of the methods disclosed herein may occur with other elements not explicitly presented and described herein. Furthermore, not all elements of the methods described herein may be required to implement a method in accordance with this disclosure. Although aspects, features, and elements are described herein in particular combinations, each aspect, feature or element may be used independently or in various combinations with or without other aspects, features and elements.

FIG. 1 is a diagram of an example of a vehicle 1000 in which the aspects, features and elements disclosed herein may be implemented. In some embodiments, the vehicle 1000 may include a chassis 1100, a powertrain 1200, a controller 1300, wheels 1400, or any other element or combination of elements of a vehicle. Although the vehicle 1000 is shown as including four wheels 1400 for simplicity, any other propulsion device or devices, such as a propeller or tread, may be used. In FIG. 1, the lines interconnecting elements, such as the powertrain 1200, the controller 1300 and the wheels 1400, indicate that information, such as data or control signals, power, such as electrical power or torque, or both information and power, may be communicated between the respective elements. For example, the controller 1300 may receive power from the powertrain 1200 and may communicate with the powertrain 1200, the wheels 1400, or both, to control the vehicle 1000, which may include accelerating, decelerating, steering, or otherwise controlling the vehicle 1000.

The powertrain 1200 may include a power source 1210, a transmission 1220, a steering unit 1230, an actuator 1240, or any other element or combination of elements of a powertrain, such as a suspension, a drive shaft, axles or an exhaust system. Although shown separately, the wheels 1400 may be included in the powertrain 1200.

The power source 1210 may include an engine, a battery, or a combination thereof. The power source 1210 may be any device or combination of devices operative to provide energy, such as electrical energy, thermal energy, or kinetic energy. For example, the power source 1210 may include an engine, such as an internal combustion engine, an electric motor, or a combination of an internal combustion engine and an electric motor, and may be operative to provide kinetic energy as a motive force to one or more of the wheels 1400. In some embodiments, the power source 1210 may include a potential energy unit, such as one or more dry cell batteries, such as nickel-cadmium (NiCd), nickel-zinc (NiZn), nickel metal hydride (NiMH), lithium-ion (Li-ion); solar cells; fuel cells; or any other device capable of providing energy.

The transmission 1220 may receive energy, such as kinetic energy, from the power source 1210, and may transmit the energy to the wheels 1400 to provide a motive force. The transmission 1220 may be controlled by the controller 1300, the actuator 1240, or both. The steering unit 1230 may be controlled by the controller 1300, the actuator 1240, or both, and may control the wheels 1400 to steer the vehicle 1000. The vehicle actuator 1240 may receive signals from the controller 1300 and may actuate or control the power source 1210, the transmission 1220, the steering unit 1230, or any combination thereof to operate the vehicle 1000.

In some embodiments, the controller 1300 may include a location unit 1310, an electronic communication unit 1320, a processor 1330, a memory 1340, a user interface 1350, a sensor 1360, an electronic communication interface 1370, or any combination thereof. Although shown as a single unit, any one or more elements of the controller 1300 may be integrated into any number of separate physical units. For example, the user interface 1350 and processor 1330 may be integrated in a first physical unit and the memory 1340 may be integrated in a second physical unit. Although not shown in FIG. 1, the controller 1300 may include a power source, such as a battery. Although shown as separate elements, the location unit 1310, the electronic communication unit 1320, the processor 1330, the memory 1340, the user interface 1350, the sensor 1360, the electronic communication interface 1370, or any combination thereof, may be integrated in one or more electronic units, circuits or chips.

In some embodiments, the processor 1330 may include any device or combination of devices capable of manipulating or processing a signal or other information now-existing or hereafter developed, including optical processors, quantum processors, molecular processors, or a combination thereof. For example, the processor 1330 may include one or more special purpose processors, one or more digital signal processors, one or more microprocessors, one or more controllers, one or more microcontrollers, one or more integrated circuits, one or more an Application Specific Integrated Circuits, one or more Field Programmable Gate Array, one or more programmable logic arrays, one or more programmable logic controllers, one or more state machines, or any combination thereof. The processor 1330 may be operatively coupled with the location unit 1310, the memory 1340, the electronic communication interface 1370, the electronic communication unit 1320, the user interface 1350, the sensor 1360, the powertrain 1200, or any combination thereof. For example, the processor may be operatively coupled with the memory 1340 via a communication bus 1380.

The memory 1340 may include any tangible non-transitory computer-usable or computer-readable medium capable of, for example, containing, storing, communicating, or transporting machine-readable instructions, or any information associated therewith, for use by or in connection with the processor 1330. The memory 1340 may be, for example, one or more solid state drives, one or more memory cards, one or more removable media, one or more read only memories, one or more random access memories, one or more disks, including a hard disk, a floppy disk, an optical disk, a magnetic or optical card, or any type of non-transitory media suitable for storing electronic information, or any combination thereof.

The communication interface 1370 may be a wireless antenna, as shown, a wired communication port, an optical communication port, or any other wired or wireless unit capable of interfacing with a wired or wireless electronic communication medium 1500. Although FIG. 1 shows the communication interface 1370 communicating via a single communication link, a communication interface 1370 may be configured to communicate via multiple communication links.

The communication unit 1320 may be configured to transmit or receive signals via the wired or wireless medium 1500, such as via the communication interface 1370. Although not explicitly shown in FIG. 1, the communication unit 1320 may be configured to transmit, receive, or both, via any wired or wireless communication medium, such as radio frequency (RF), ultra violet (UV), visible light, fiber optic, wire line, or a combination thereof. Although FIG. 1 shows a single communication unit 1320 and a single communication interface 1370, any number of communication units and any number of communication interfaces may be used.

The location unit 1310 may determine geolocation information, such as longitude, latitude, elevation, direction of travel, or speed, of the vehicle 1000. For example, the location unit may include a global positioning system (GPS) unit, such as a Wide Area Augmentation System (WAAS) enabled National Marine Electronics Association (NMEA) unit, a radio triangulation unit, or a combination thereof. The location unit 1310 can be used to obtain information that represents, for example, a current heading of the vehicle 1000, a current position of the vehicle 1000 in two or three dimensions, a current angular orientation of the vehicle 1000, or a combination thereof.

The user interface 1350 may include any unit capable of interfacing with a person, such as a virtual or physical keypad, a touchpad, a display, a touch display, a speaker, a microphone, a video camera, a sensor, a printer, or any combination thereof. The user interface 1350 may be operatively coupled with the processor 1330, as shown, or with any other element of the controller 1300. Although shown as a single unit, the user interface 1350 may include one or more physical units. For example, the user interface 1350 may include an audio interface for performing audio communication with a person and/or a touch display for performing visual and touch-based communication with the person.

The sensor 1360 often includes one or more sensors 1360, such as an array of sensors, which may be operable to provide information that may be used to control the vehicle 1000. The sensor 1360 may provide information regarding current operating characteristics of the vehicle. When multiple sensors 1360 are included, they can include, for example, a speed sensor, acceleration sensors, a steering angle sensor, traction-related sensors, braking-related sensors, or any sensor, or combination of sensors, that is operable to report information regarding some aspect of the current dynamic situation of the vehicle 1000.

In some embodiments, the sensors 1360 may include one or more sensors that are operable to obtain information regarding the physical environment surrounding the vehicle 1000. For example, one or more sensors 1360 may detect road geometry and obstacles, such as fixed obstacles, vehicles and pedestrians. In some embodiments, the sensors 1360 can be or include one or more video cameras, laser-sensing systems, infrared-sensing systems, acoustic-sensing systems, or any other suitable type of on-vehicle environmental sensing device, or combination of devices, now known or later developed. In some embodiments, the sensors 1360 and the location unit 1310 may be combined.

Although not shown separately, in some embodiments, the vehicle 1000 may include a trajectory controller. The trajectory controller may be operable to obtain information describing a current state of the vehicle 1000 and a route planned for the vehicle 1000, and, based on this information, to determine and optimize a trajectory for the vehicle 1000. In some embodiments, the trajectory controller may output signals operable to control the vehicle 1000 such that the vehicle 1000 follows the trajectory that is determined by the trajectory controller. For example, the output of the trajectory controller can be an optimized trajectory that may be supplied to the powertrain 1200, the wheels 1400, or both. In some embodiments, the optimized trajectory can be control inputs such as a set of steering angles, with each steering angle corresponding to a point in time or a position. In some embodiments, the optimized trajectory can be one or more lanes, lines, curves, paths, or a combination thereof. The trajectory controller may be implemented, at least in part, using one or more elements of the controller 1300.

One or more of the wheels 1400 may be a steered wheel, which may be pivoted to a steering angle under control of the steering unit 1230, a propelled wheel, which may be torqued to propel the vehicle 1000 under control of the transmission 1220, or a steered and propelled wheel that may steer and propel the vehicle 1000.

Although not shown in FIG. 1, the vehicle 1000 may include units, or elements not shown in FIG. 1, such as an enclosure, a Bluetooth® module, a frequency modulated (FM) radio unit, a Near Field Communication (NFC) module, a liquid crystal display (LCD) display unit, an organic light-emitting diode (OLED) display unit, a speaker, or any combination thereof.

Figure 2:
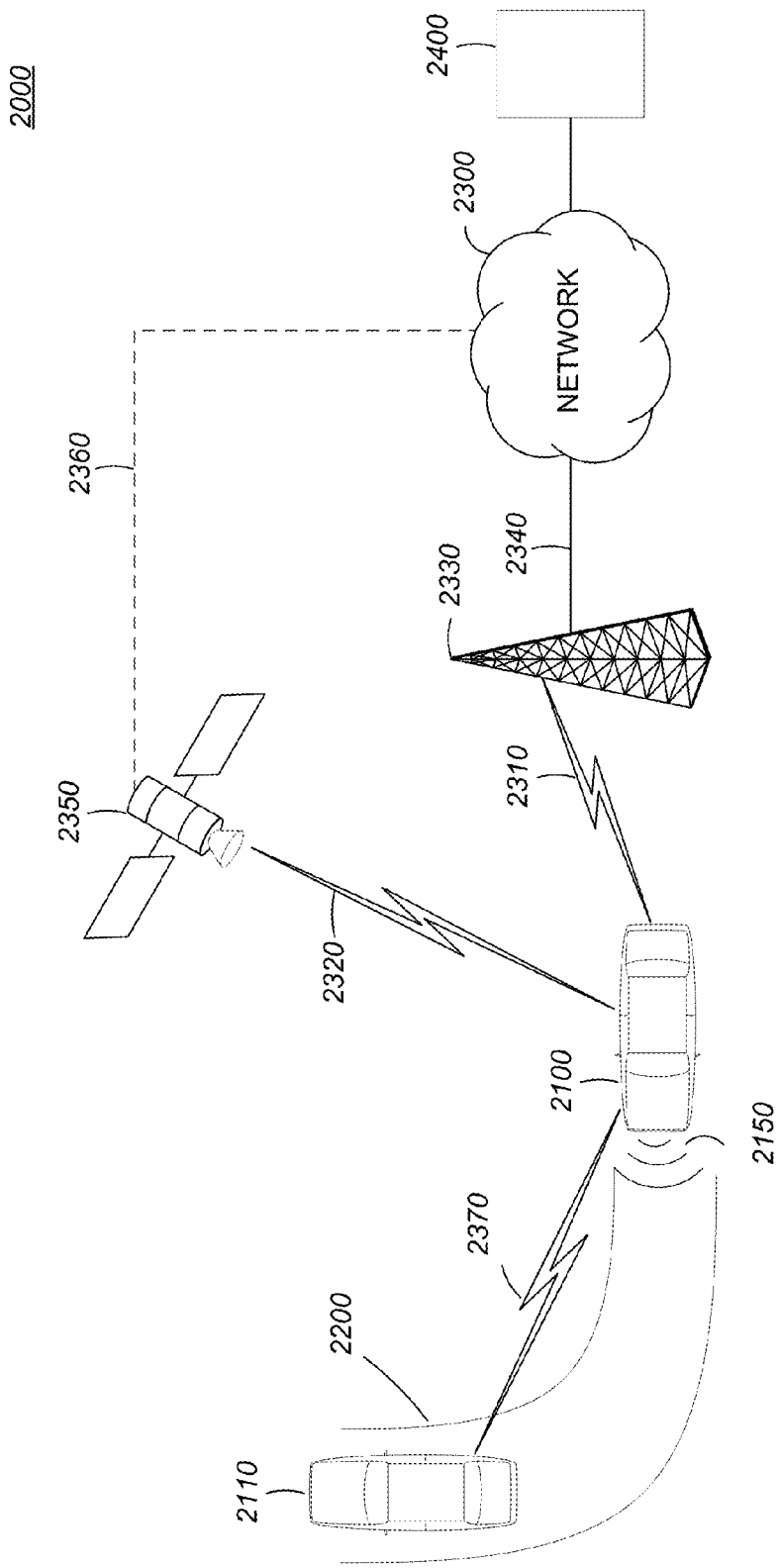
FIG. 2 is a diagram of an example of a portion of a vehicle transportation and communication system in which the aspects, features and elements disclosed herein may be implemented.

FIG. 2 is a diagram of an example of a portion of a vehicle transportation and communication system in which the aspects, features and elements disclosed herein may be implemented. The vehicle transportation and communication system 2000 may include at least two vehicles 2100/2110, each of which may be configured similarly to the vehicle 1000 shown in FIG. 1, which travel via one or more portions of one or more vehicle transportation networks 2200, and may communicate via one or more electronic communication networks 2300. Although not explicitly shown in FIG. 2, a vehicle may traverse an area that is not expressly or completely included in a vehicle transportation network, such as an off-road area.

In some embodiments, the electronic communication network 2300 may be, for example, a multiple access system and may provide for communication, such as voice communication, data communication, video communication, messaging communication, or a combination thereof, between each vehicle 2100/2110 and one or more communicating devices 2400. For example, a vehicle 2100/2110 may receive information, such as information representing the vehicle transportation network 2200, from a communicating device 2400 via the network 2300. In certain embodiments described herein, the electronic communication network 2300 can be used in vehicle-to-vehicle communication of the basic safety message containing location and trajectory information of the vehicle 2100. Each vehicle 2100/2110 may also communicate this information directly to one or more other vehicles as discussed in more detail below.

In some embodiments, a vehicle 2100/2110 may communicate via a wired communication link (not shown), a wireless communication link 2310/2320/2370, or a combination of any number of wired or wireless communication links. For example, as shown, a vehicle 2100/2110 may communicate via a terrestrial wireless communication link 2310, via a non-terrestrial wireless communication link 2320, or via a combination thereof. In some implementations, a terrestrial wireless communication link 2310 may include an Ethernet link, a serial link, a Bluetooth link, an infrared (IR) link, an ultraviolet (UV) link, or any link capable of providing for electronic communication.

In some embodiments, a vehicle 2100/2110 may communicate with another vehicle 2100/2110. For example, a host, or subject, vehicle (HV) 2100 may receive one or more automated inter-vehicle messages, such as the basic safety message, from a remote, or target, vehicle (RV) 2110, via a direct communication link 2370, or via the network 2300. For example, the remote vehicle 2110 may broadcast the message to host vehicles within a defined broadcast range, such as 300 meters. In some embodiments, the host vehicle 2100 may receive a message via a third party, such as a signal repeater (not shown) or another remote vehicle (not shown). In some embodiments, a vehicle 2100/2110 may transmit one or more automated inter-vehicle messages periodically based on a defined interval, such as 100 milliseconds.

Automated inter-vehicle messages may include vehicle identification information, spatial state information, such as longitude, latitude and/or elevation information, geospatial location accuracy information, kinematic state information, such as vehicle acceleration information, yaw rate information, speed information, vehicle heading information, braking system status information, throttle information, steering wheel angle information, or vehicle routing information, or vehicle operating state information, such as vehicle size information, headlight state information, turn signal information, wiper status information, transmission information, or any other information, or combination of information, relevant to the transmitting vehicle state. For example, transmission state information may indicate whether the transmitting vehicle is in a neutral state, a parked state, a forward state or a reverse state.

Some or all of the above information regarding the host vehicle 2100 and/or the remote vehicle 2110 may be received from sensors and not from automated inter-vehicle messages. As one example, the communication unit 1320 can receive SONAR, RADAR, and/or LIDAR signals from which vehicle position, speed, acceleration and instantaneous heading can be calculated.

In some embodiments, the vehicle 2100 may communicate with the communications network 2300 via an access point 2330. The access point 2330, which may include a computing device, may be configured to communicate with a vehicle 2100, with a communication network 2300, with one or more communication devices 2400, or with a combination thereof via wired or wireless communication links 2310/2340. For example, an access point 2330 may be a base station, a base transceiver station (BTS), a Node-B, an enhanced Node-B (eNode-B), a Home Node-B (HNode-B), a wireless router, a wired router, a hub, a relay, a switch, or any similar wired or wireless device. Although shown as a single unit, an access point may include any number of interconnected elements.

In some embodiments, the vehicle 2100 may communicate with the communications network 2300 via a satellite 2350, or other non-terrestrial communication device. The satellite 2350, which may include a computing device, may be configured to communicate with the vehicle 2100, with the communication network 2300, with one or more communication devices 2400, or with a combination thereof via one or more communication links 2320/2360. Although shown as a single unit, a satellite may include any number of interconnected elements.

The vehicle 2110 may similarly communicate with the communications network 2300 via the access point 2330 and/or the satellite 2350.

An electronic communication network 2300 may be any type of network configured to provide for voice, data, or any other type of electronic communication. For example, the electronic communication network 2300 may include a local area network (LAN), a wide area network (WAN), a virtual private network (VPN), a mobile or cellular telephone network, the Internet, or any other electronic communication system. The electronic communication network 2300 may use a communication protocol, such as the transmission control protocol (TCP), the user datagram protocol (UDP), the internet protocol (IP), the real-time transport protocol (RTP) the Hyper Text Transport Protocol (HTTP), or a combination thereof. Although shown as a single unit, an electronic communication network may include any number of interconnected elements.

In some embodiments, a vehicle 2100 may identify a portion or condition of the vehicle transportation network 2200. For example, the vehicle may include one or more on-vehicle sensors 2150, such as sensor 1360 shown in FIG. 1, which may include a speed sensor, a wheel speed sensor, a camera, a gyroscope, an optical sensor, a laser sensor, a radar sensor, a sonic sensor, or any other sensor or device or combination thereof capable of determining or identifying a portion or condition of the vehicle transportation network 2200.

In some embodiments, a vehicle 2100 may traverse a portion or portions of one or more vehicle transportation networks 2200 using information communicated via the network 2300, such as information representing the vehicle transportation network 2200, information identified by one or more on-vehicle sensors 2105, or a combination thereof.

Although, for simplicity, FIG. 2 shows one vehicle transportation network 2200, one electronic communication network 2300, and one communication device 2400, any number of networks or communication devices may be used. In some embodiments, the vehicle transportation and communication system 2000 may include devices, units or elements not shown in FIG. 2. Although each vehicle 2100/2110 is shown as a single unit, a vehicle may include any number of interconnected elements.

Although the vehicle 2100 is shown communicating with the communication device 2400 via the network 2300, the vehicle 2100 and/or the vehicle 2110 may communicate with the communication device 2400 via any number of direct or indirect communication links. For example, each vehicle 2100/2110 may communicate with the communication device 2400 via a direct communication link, such as a Bluetooth communication link.

Figure 3:
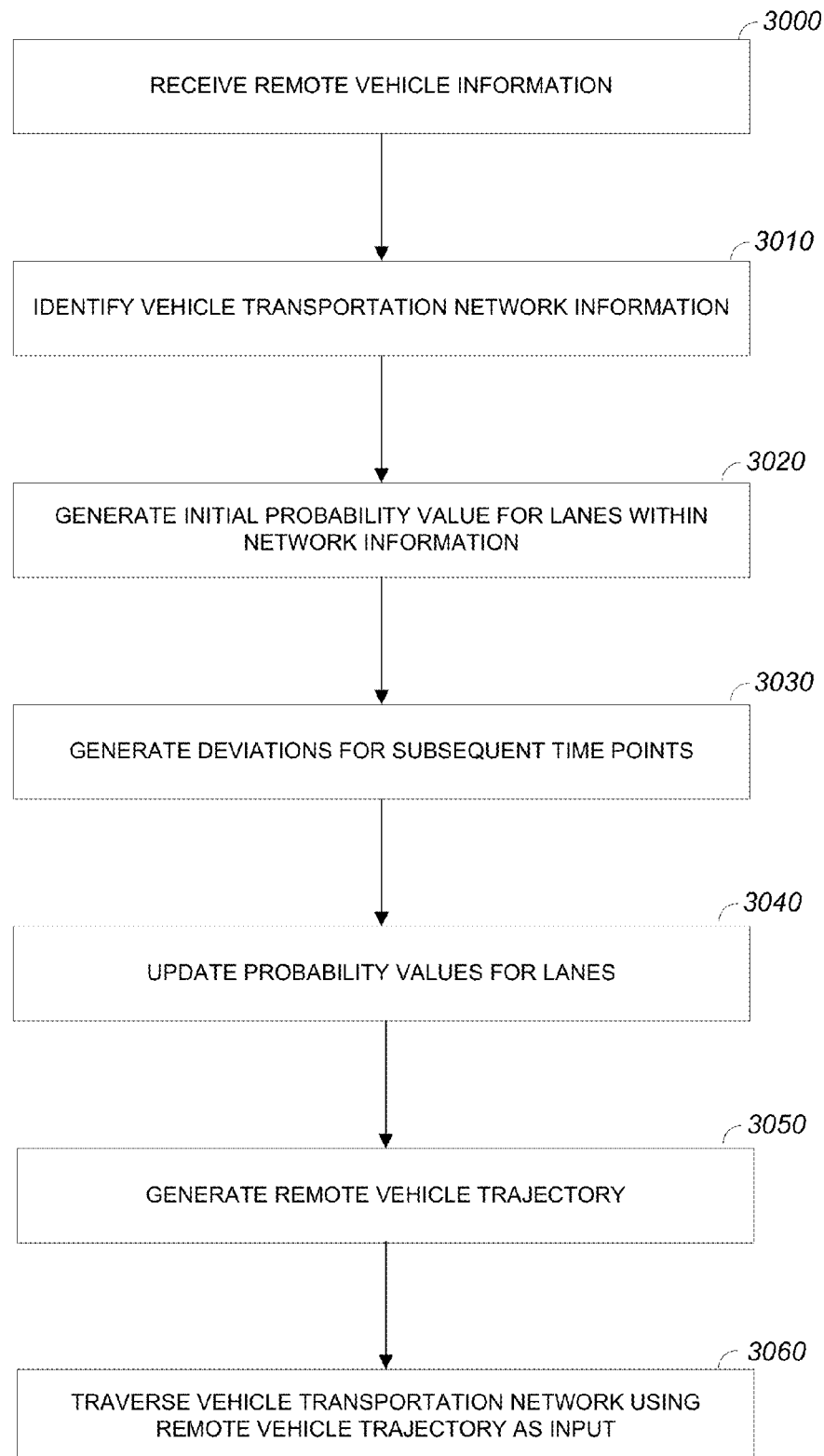
FIG. 3 is a flow chart of a method of generating projected vehicle information for use in traversing a vehicle transportation network according to the teachings herein.

FIG. 3 is a flow chart of a method of generating projected vehicle information for use in traversing a vehicle transportation network according to the teachings herein. In some embodiments, the method may be implemented in a vehicle, such as the vehicle 1000 shown in FIG. 1 or the vehicles 2100/2110 shown in FIG. 2. In other embodiments, the method may be implemented in whole or in part external of vehicles, such as within one or more processors of communication device 2400, with transmission of relevant information, such as a remote vehicle trajectory or a generated route, to one or more vehicles.

In some embodiments, the method includes receiving remote vehicle information at 3000, identifying vehicle transportation network information at 3010, generating an initial probability value for one or more lanes within the vehicle transportation network information at 3020, generating deviations in the vehicle along the lanes for subsequent time points at 3030, updating the probability values for the lanes at 3040, generating the remote vehicle trajectory over time at 3050, and traversing the vehicle transportation network using the remote vehicle trajectory as input at 3060.

A host vehicle receives remote vehicle information while traversing a portion of a vehicle transportation network at 3000. Remote vehicle information received by a host vehicle at 3000 includes remote vehicle spatial state information and may include remote vehicle kinematic state information for the remote vehicle, or data from which this information may be generated. The remote vehicle spatial state information may include, for example, geospatial coordinates for the remote vehicle. These coordinates may be GPS coordinates for a latitude and a longitude of the remote vehicle in some embodiments. The remote vehicle kinematic state information may include a speed, acceleration, heading angle, etc., or information from which this information may be determined.

For example, remote vehicle spatial state information may be received by importing the information from one or more datasets. In one example, the information is imported from signals sent through the wireless electronic communication medium 1500 from the location unit 1310 of FIG. 1. The information may be associated with records from a single remote vehicle or multiple remote vehicles. Each record in a dataset may be associated with a vehicle identifier, and individual remote vehicles may be uniquely identified based on the vehicle identifiers. The records may also include date and time stamps, and may be retrieved periodically or on an as-needed basis, such as when the vehicle transportation network upon which a vehicle is traveling changes.

In some embodiments, remote vehicle spatial state information may be received from a location of an infrastructure device in the vehicle transportation network. Such infrastructure devices may include smart devices such as a traffic light, a road sensor, a road camera, or any other non-vehicle device associated with the vehicle transportation network and capable of detecting a vehicle.

In some embodiments, remote vehicle spatial state information may be received from a portable device while it is associated with a vehicle. For example, a portable device, such as a smartphone, carried by a passenger of the vehicle may include geographic location information, such as GPS or assisted GPS (AGPS) information and may include information associating the passenger with the vehicle.

The collection of vehicle spatial state information is not limited to any particular technique provided that the technique can associate the vehicle spatial state information with at least one other piece of information such as time and a particular remote vehicle. For example, SONAR, RADAR, and/or LIDAR mounted on vehicles or infrastructure devices may provide input that can be used to calculate or otherwise generate vehicle spatial state information at 3000.

Similar techniques may be used to receive remote vehicle kinematic state information. For example, when a remote vehicle remains at the same location between two measurements, it can be determined that the remote vehicle is not moving. In contrast, when the remote vehicle spatial state information is different for a remote vehicle between two measurements, the information and the amount of time between the two measurements may be used to generate a speed of the remote vehicle.

In some implementations, remote vehicle information received by a host vehicle at 3000 may be in the form of the automated vehicle messages described above. The information may be received in whole or in part through dedicated short-range communications (DSRC) in vehicle-to-vehicle (V2V) and vehicle-to-infrastructure (V2I) short-range wireless communications.

The remote vehicle information may be stored in memory of the host vehicle or elsewhere for subsequent processing and may be stored with a time stamp. Optionally, host vehicle information may be received and stored using similar techniques. Although not expressly shown in FIG. 3, raw observations (e.g., location and velocity) may be filtered to minimize noise and signal corruption.

At 3010, vehicle transportation network information that represents a portion of the vehicle transportation network is identified. The identification may be based on the remote vehicle spatial state information, and the remote vehicle is located within the remote vehicle transportation network information.

A vehicle transportation network may include one or more unnavigable areas, such as a building, one or more partially navigable areas, such as a parking area, one or more navigable areas, such as roads, or a combination thereof. The vehicle transportation network may include one or more interchanges between one or more navigable, or partially navigable, areas. A portion of the vehicle transportation network, such as a road, may include one or more lanes, and may be associated with one or more directions of travel. Lanes can be marked or unmarked.

In some embodiments, a vehicle transportation network, or a portion thereof, such as the portion of the vehicle transportation network discussed hereinafter, may be represented as vehicle transportation network information. For example, vehicle transportation network information may be expressed as a hierarchy of elements, such as markup language elements, which may be stored in a database or file. For simplicity, the figures herein depict vehicle transportation network information representing portions of a vehicle transportation network as diagrams or maps; however, vehicle transportation network information may be expressed in any computer-usable form capable of representing a vehicle transportation network, or a portion thereof. In some embodiments, the vehicle transportation network information may include vehicle transportation network control information, such as direction of travel information, speed limit information, toll information, grade information, such as inclination or angle information, surface material information, aesthetic information, or a combination thereof.

In some embodiments, the vehicle transportation network may be associated with, or may include, a pedestrian transportation network such as a pedestrian walkway or a sidewalk or a bicycle transportation network such as one or more bicycle lanes. The pedestrian transportation network may correspond with a non-navigable area or a partially navigable area of a vehicle transportation network. Similarly, a bicycle transportation network may correspond with a non-navigable area or a partially navigable area of a vehicle transportation network. Although the description here uses a motor vehicle, the teachings are applicable to other vehicles that travel along a defined lane within the vehicle transportation network such as a motorized bicycle or motorcycle.

Figure 4A:
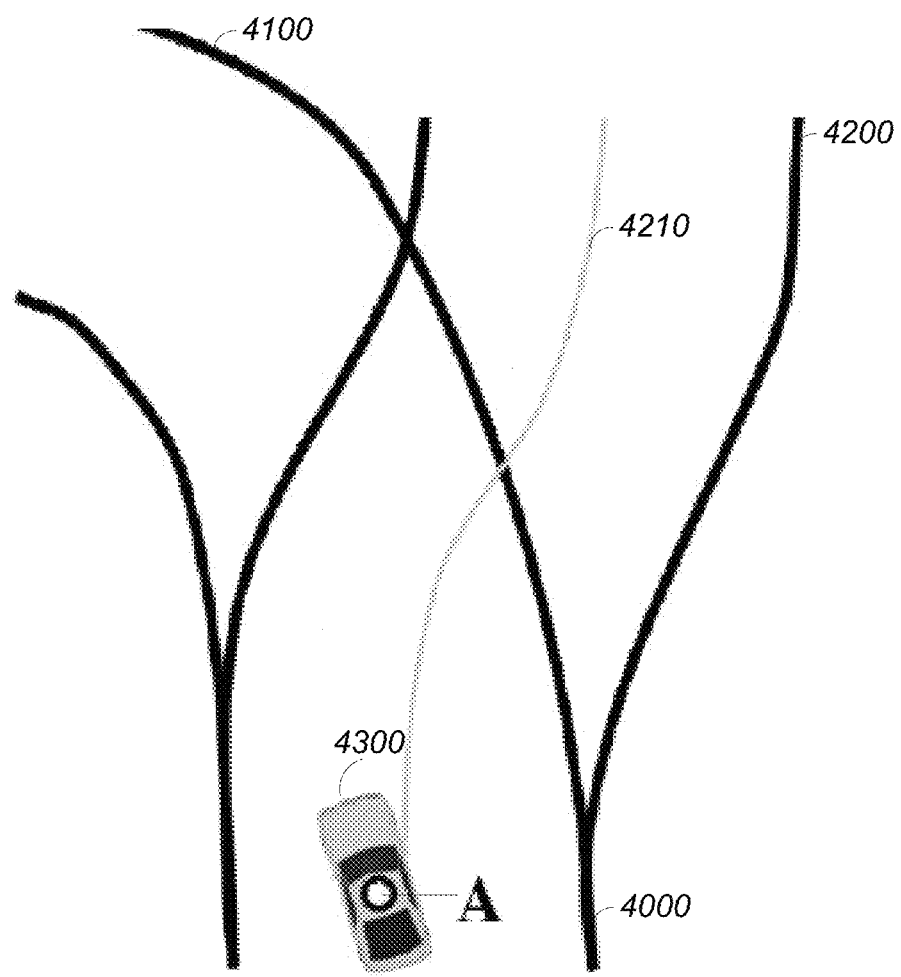
FIG. 4A is a diagram illustrating a remote vehicle within a portion of a vehicle transportation network at an initial time point for use in generating projected vehicle information in accordance with this disclosure.

FIG. 4A is a diagram illustrating a remote vehicle within a portion of a vehicle transportation network at an initial time point for use in generating projected vehicle information in accordance with this disclosure. As mentioned above, vehicle transportation network information that represents a portion of the vehicle transportation network may be identified based on the remote vehicle spatial state information. The portion may include, in addition to a current lane in which the remote vehicle is traveling, successor and predecessor lanes to the current lane and any adjacent lanes (also referred to as sibling lanes) that are near the remote vehicle. The portion could be a defined distance or could be variable based on the traveling speed of the remote vehicle. For example, the portion could be identified based on a radius defined by how far the remote vehicle could travel at its current speed.

For simplicity of explanation, FIG. 4A shows only two lanes or lanes 4100, 4200 extending from a common lane 4000, each having no sibling lanes. A centerline 4210 of lane 4200 is also shown. The remote vehicle 4300 is located within the portion of the vehicle transportation network information at an initial time point, which location is represented as point A. The location on a lane may be referred to as the pose of the remote vehicle. In order to represent the remote vehicle within the vehicle transportation network information, the remote vehicle spatial state information and vehicle transportation network information should be identified in the same coordinate system. To this end, the coordinates of the remote vehicle spatial state information are transformed to a common coordinate system. The common coordinate system may be, in some embodiments, the Universal Transverse Mercator (UTM) coordinate system such that the input points are transformed to UTM coordinates in each UTM zone. For example, when the vehicle spatial state information is imported as GPS coordinates, the vehicle spatial state information identified from the datasets may be transformed to UTM coordinates according to known conversion formulas. Other coordinate systems are possible as long as the selected system is used consistently.

Referring again to FIG. 3, the method proceeds to 3020 after identifying the vehicle transportation network information at 3010. At 3020, at least one initial probability value is generated based on a comparison of the remote vehicle spatial state information and the vehicle transportation network information at an initial time point. Each initial probability value indicates likelihood that the remote vehicle is following a single lane within the vehicle transportation network information. It can also be considered as the probability that the vehicle is following the orientation of a specific lane or as the driving intention state. When the remote vehicle is in an intersection, for example, the driving intention state can be to go straight, turn left, or turn right. When the remote vehicle is on a road (a non-intersection), the driving intention state can be to go straight, make a left lane change, or make a right lane change.

As shown in the example of FIG. 4A, the remote vehicle 4300 is at the location identified by point A at the initial time point (also call the first calculation point or first point). The first calculation point can be any point within a series of received data for the remote vehicle. It can be located at the first point at which a unique id associated with the remote vehicle is detected or assigned, for example. The initial probability value at the first calculation point can be generated in any number of ways. As one example, when the remote vehicle is on a lane or lane having no sibling lanes, the initial probability value is 1 as the likelihood of going straight is 100%. When the remote vehicle is at an intersection, the probabilities may be inferred based on the potential options available to the vehicle at the first calculation point. In FIG. 4A, for example, there are only two driving intention states at an intersection—going straight to follow lane or lane 4100 or turning right to follow lane or lane 4200. Thus, the probability of going straight or turning right is equal at 0.5. If there were three lanes at an intersection, this simple probability estimation formula would result in the probability of each of the three driving invention states—going straight, turning left and turning right—being ⅓.

In some variations, the likelihoods may vary based on other variables. As one example, where the remote vehicle has sent a V2V or V2I signal, that signal often includes other data. A turn signal may be used to more heavily weigh one driving intention state over another. In other words, there may be situations in which the remote vehicle is in a position or other circumstances occur such that the probabilities are not evenly distributed among the possible options.

Referring again to FIG. 3, after the initial probability value for each lane is generated at 3020, deviations in the remote vehicle spatial state information are generated for subsequent time points at 3030, and, for each single lane, probability values for the lanes are updated at 3040. These steps are explained briefly with reference to FIGS. 4B and 4C, and a more detailed explanation follows with reference to FIG. 5. While processing at 3030 and at 3040 occurs for each single lane upon which the remote vehicle may travel, explanation is provided with respect to one lane only. Other lanes may be similarly processed.

Figure 4B:
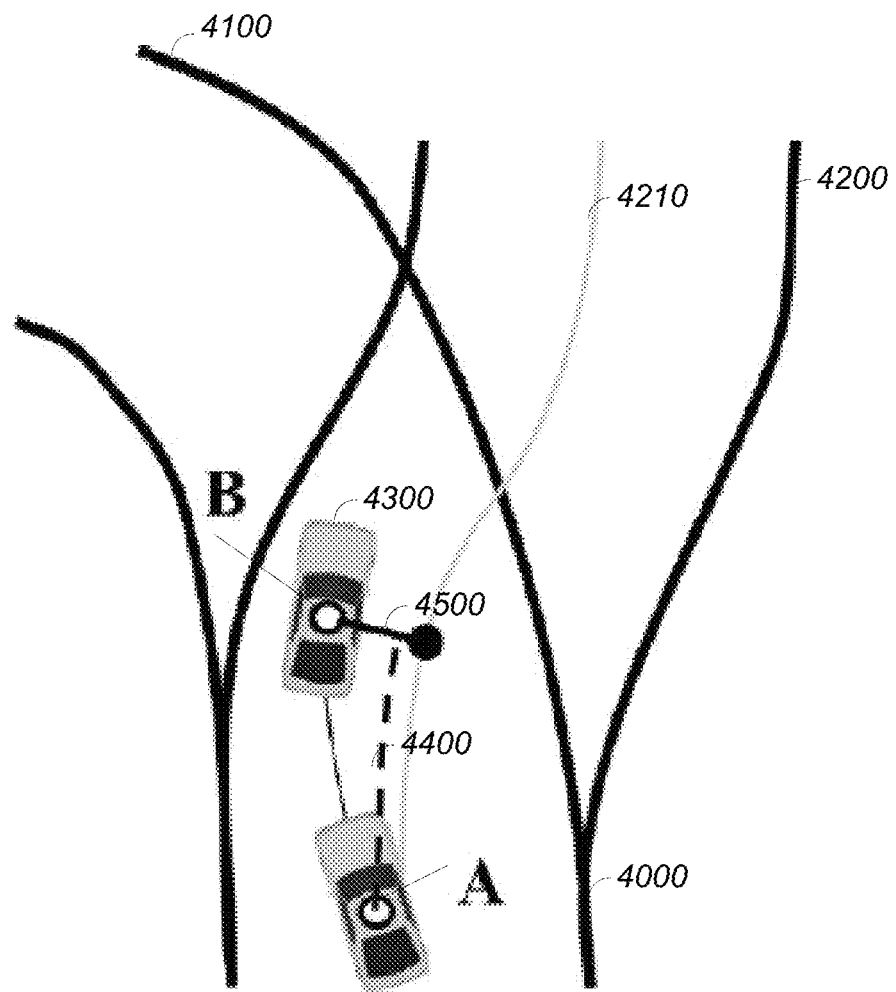
FIG. 4B is a diagram illustrating the remote vehicle within the portion of the vehicle transportation network at a subsequent time point to the time point of FIG. 4A for use in generating projected vehicle information in accordance with this disclosure.
Figure 4C:
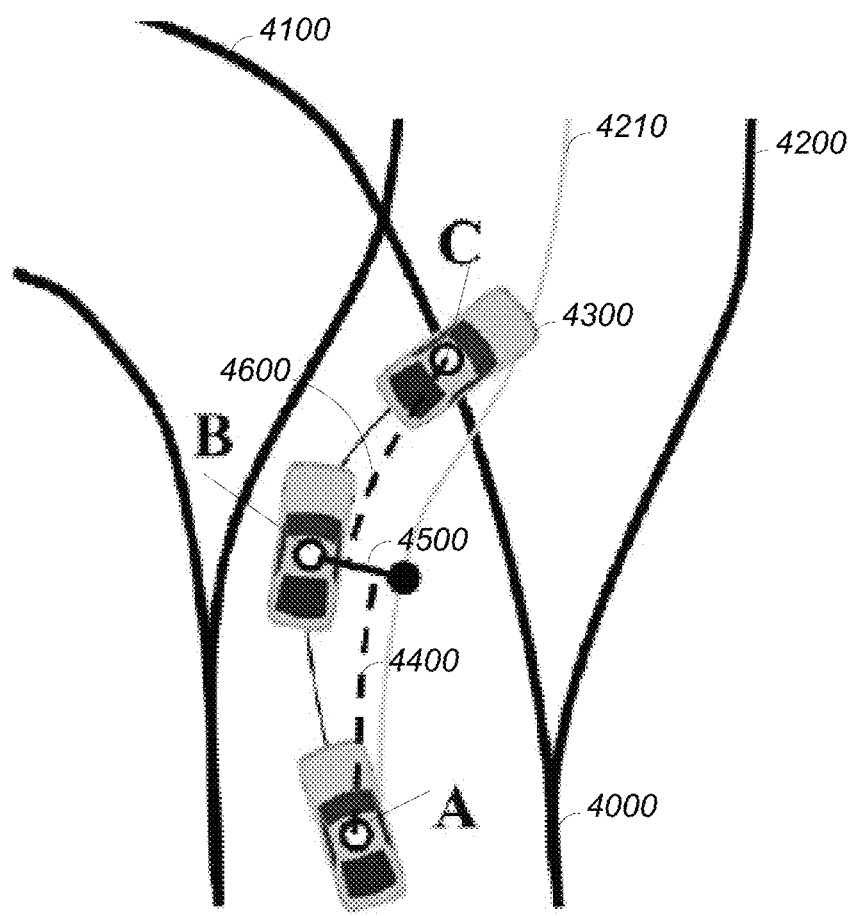
FIG. 4C is a diagram illustrating the remote vehicle within the portion of the vehicle transportation network at a subsequent time point to the time point of FIG. 4B for use in generating projected vehicle information in accordance with this disclosure.

FIG. 4B is a diagram illustrating the remote vehicle 4300 within the portion of the vehicle transportation network at a subsequent time point to the time point of FIG. 4A, and FIG. 4C is a diagram illustrating the remote vehicle 4300 within the portion of the vehicle transportation network at a subsequent time point to the time point of FIG. 4B. That is, the remote vehicle 4300 continues to travel after it is located at first point A in FIG. 4A, and is identified by the remote vehicle spatial state information at a second point B in FIG. 4B and then at a third point C in FIG. 4C. The remote vehicle 4300 travels further away from the centerline 4210 of the lane 4200 when progressing from the first point A to the second point B and then travels closer to the centerline 4210 of the lane 4200 when progressing from the second point B to the third point C. Intuitively, then, the probability that the remote vehicle 4300 will follow the lane 4200 decreases at the second point B and increases at the third point C. A deviation of the remote vehicle 4300 between adjacent values for the remote vehicle spatial state information relative to the vehicle transportation network information can be generated and used to generate a new probability over time.

More specifically, a deviation may be generated by locating a dashed line 4400 that extends in parallel with the centerline 4210 of the lane 4200 from a Euclidean line 4500 between the second point B and the centerline 4210 of the lane 4200 to the first point A. The difference between the second point B and the point where the first point A is projected onto the Euclidian line 4500 by the dashed line 4400 represents the deviation in the trajectory of the remote vehicle 4300 from the first point A to the second point B. Similarly, the next deviation may be generated by locating a dashed line 4600 that extends in parallel with the centerline 4210 of the lane 4200 from the third point C to the Euclidean line 4500 between the second point B and the centerline 4210 of the lane 4200. The difference between the second point B and where the third point C is projected onto the Euclidean line 4500 by the dashed line 4600 represents the deviation in the trajectory of the remote vehicle 4300 from the second point B to the third point C. Alternatively, a Euclidean line could extend from the centerline 4210 through the third point C (similar to line 4500 through the second point B), and a parallel line could project forward from the second point B to that Euclidean line. Then, the difference between the third point C and the point where the second point B is projected onto the Euclidean line by the parallel line also represents the deviation in the trajectory of the remote vehicle 4300 from the second point B to the third point C. These deviations may also be referred to as relative deviations.

Once the deviations are generated at 3030, the probability values can be updated at 3040. That is, for each single lane and for each deviation, the likelihood that the remote vehicle is following the single lane can be updated using a new probability value based on the deviation. For example, the probability of following the lane 4200 at the first point A is 0.5. A new probability value based on the relative deviation between the first point A and the second point B may be, for example, a probability of deviation from the previous point. For illustrative purposes, a value of 0.8 is used. The updated likelihood is thus 0.5×0.8=0.4, which conforms to the intuitive result that the likelihood that the remote vehicle is following the lane 4200 decreases at the second point B as compared to the first point A. Similarly, a new probability value based on the relative deviation between the second point B and the third point C may be a probability of deviation from the previous point. For illustrative purposes, a value of 0.5 is used. In this calculation, the updated likelihood is 0.4 (the likelihood at the second point B)/0.5=0.8, which conforms to the intuitive result that the likelihood that the remote vehicle is following the lane 4200 increases at the third point C as compared to the second point B. Note that the new probability value is used to divide the likelihood at the previous point because the remote vehicle 4300 is moving closer to the centerline 4210 so the updated likelihood must increase.

The simple example of FIGS. 4A-4C illustrates the use of the relative deviation in updating the likelihood that the remote vehicle is following a particular lane. What is needed, however, is a calculation scheme that relates deviations to probabilities. Several functions may be used. Herein, however, it is assumed that the lateral distribution of points along a centerline, such as the centerline 4210, is Gaussian. Therefore, the cumulative distribution function of Gaussian is used to relate deviations to probabilities. In a normal distribution function with a mean of 0 and a standard deviation ($\sigma$) of 1.0, 68.27% of the values are within 1$\sigma$ from the mean, 95.45% of the values are within 2$\sigma$ from the mean, and 99.73% of the values are within 3$\sigma$ from the mean. Using the left half of the cumulative distribution function (cdf) for illustration, when x represents the deviation from the mean, the following correspondences result:

$$\text{cdf}(x=-2)=\text{cdf}(-2.0)=0.2275;$$

$$\text{cdf}(x=-1)=\text{cdf}(-1.0)=0.16; \text{ and}$$

$$\text{cdf}(x=0)=\text{cdf}(0)=0.5.$$

Thus, the probability function f(x) used is:

$$f(x)=2*\text{cdf}(-abs(x)).$$

Because only half of the function is considered, multiplying the cumulative distribution function by two (2) scales the maximum probability from 0.5 to 1. It is desirable if the values of x fall within a defined range such as x=±3$\sigma$ so that when the remote vehicle moves to the left or right boundary of the lane, the probability that it is following the lane is close to 0. This may be achieved by defining $\sigma$ for a particular lane as LaneWidth/(2*3) where LaneWidth is a width (e.g., 12 feet) of the lane. For example, when the vehicle moves to the boundary of the lane where x=±(LaneWidth/2), the probability of following the lane is very close to zero because x is 3$\sigma$.

Figure 5:
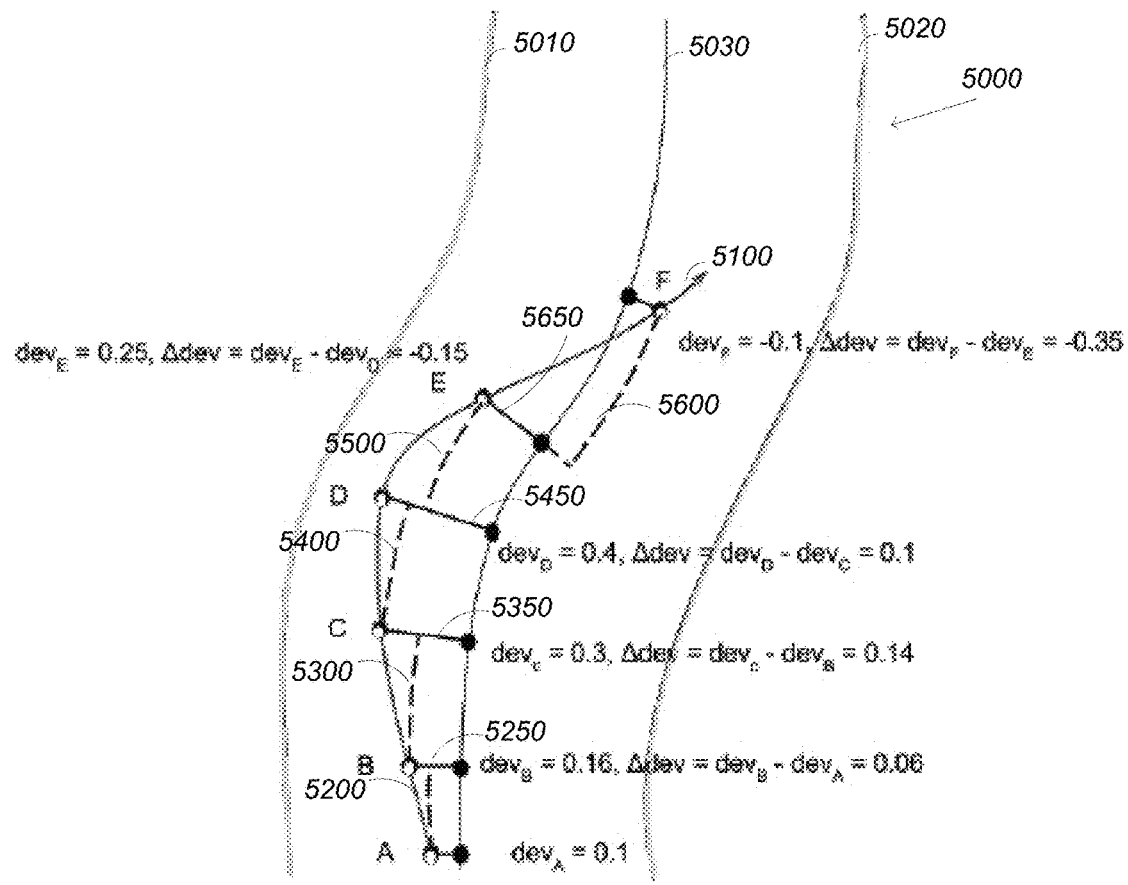
FIG. 5 is a diagram illustrating the calculation of a deviation between adjacent values for remote vehicle spatial state information relative to vehicle transportation network information.

Use of the probability function f(x) to update the likelihood that the remote vehicle is following the single lane is described with reference to FIG. 5, which illustrates the calculation of a deviation between adjacent values for remote vehicle spatial state information relative to vehicle transportation network information. FIG. 5 uses positive values for the deviation to the left and negative values for deviation to the right as an example—which side is positive does not affect the technique. A single lane 5000 is shown that has a left lane boundary 5010, a right lane boundary 5020 and a centerline 5030. The centerline 5030 is most often not labeled or shown in conventional map data and may be defined for the purposes herein as the midpoint between the left lane boundary 5010 and the right lane boundary 5020.

In FIG. 5, a solid line 5100 indicates the trajectory of the vehicle along the lane 5000. The vehicle was observed at points A, B, C, D, E, F over time (i.e., at the white dots). The black dots mark the point on centerline 5030 that is closest to the location of the vehicle at the instant of observation. As mentioned briefly with respect to FIGS. 4B and 4C, this defines a Euclidean line. The Euclidean distance between respective white and black dots is the deviation of the vehicle from the centerline 5030 at the instant of observation. However, it is the deviation between points that is of interest.

According to the processing of FIG. 3, it is assumed that the remote vehicle was first observed at point A. Point A is the point at which the initial probability value for the lane 5000 is generated at 3020. Here, the probability of going straight is 1.0 as only one lane is shown.

At 3030, deviations for subsequent time points are generated. For example, each deviation may be calculated for a new point by extending a Euclidean line through the new point and the centerline, extending a line from the previous point to the Euclidean line, and calculating a difference between the new point and point where the previous point intersects the Euclidean line. In FIG. 5, however, the deviations are calculated in a like manner as described with respect to FIGS. 4B and 4C. The deviation of the vehicle from the centerline 5030 at point A is $dev_A$=0.1, and the deviation of the vehicle from the centerline 5030 at point B is $dev_B$=0.16. Accordingly, the change in the deviation $dev_\Delta$ from point A to point B is calculated as $dev_B-dev_A$=0.06. This is the difference between point B and the point where point A is projected onto the Euclidean line 5250 by parallel line 5200. The deviation of the vehicle from the centerline 5030 at point C is $dev_C$=0.3, so the change in the deviation $dev_\Delta$ from point B to point C is calculated as $dev_C-dev_B$=0.14. This is the difference between point C and the point where point B is projected onto the Euclidean line 5350 by parallel line 5300. The deviation of the vehicle from the centerline 5030 at point D is $dev_D$=0.4, so the change in the deviation $dev_\Delta$ from point C to point D is calculated as $dev_D-dev_C$=0.1. This is the difference between point D and the point where point C is projected onto the Euclidean line 5450 by parallel line 5400. The deviation of the vehicle from the centerline 5030 at point E is $dev_E$=0.25, so the change in the deviation $dev_\Delta$ from point D to point E is calculated as $dev_E-dev_B$=−0.15. This is the difference between point D and the point where point E is projected onto the Euclidean line 5450 by parallel line 5500. The deviation of the vehicle from the centerline 5030 at point F is $dev_F$=−0.1, so the change in the deviation $dev_\Delta$ from point E to point F is calculated as $dev_F-dev_E$=−0.35. This is the difference between point E and the point where point F is projected onto the Euclidean line 5650 by parallel line 5600.

After the deviations are generated at 3030, the probability values are updated for the lane 5000 at 3040. In some embodiments, they are updated using the probability function $f(x)$ and the generated deviations. Using the values in FIG. 5, the going straight probability (i.e., the likelihood of following lane 5000) can be calculated according to the following general rules.

The probability of going straight GS at point Xt when the vehicle is deviating either to the left boundary line 5010 or to the right boundary line 5020 from the centerline 5030 of the lane 5000 may be calculated as follows:

$$p(GS \text{ at point } X_t)=p(GS \text{ at point } X_{t-1})*f(dev_\Delta \text{at point } X_t).$$

The probability of going straight GS at point Xt when the vehicle is moving toward the centerline 5030 of the lane 5000 may be calculated as follows:

$$p(GS \text{ at point } X_t)=p(GS \text{ at point } X_{t-1})/f(dev_\Delta \text{ at point } X_t).$$

Assuming that the initial probability value at point A is 1.0, the probability at point B is updated as follows:

$$p(GS \text{ at point } B)=p(GS \text{ at point } A)*f(dev_\Delta \text{ at point } B)$$

$$p(GS \text{ at point } B)=1.0*f(0.06)$$

$$p(GS \text{ at point } B)=1.0*2*\text{cdf}(-abs(0.06))=0.952$$

In a like manner, the probability at point C is updated as follows:

$p(GS$ at point $C)=p(GS$ at point $B)*f(\text{dev}_\Delta$ at point $C)$ $p(GS$ at point $C)=0.952*f(0.14)$ $p(GS$ at point $C)=0.952*2*\text{cdf}(-abs(0.14))=0.846$ The probability at point D is updated as follows:

$p(GS$ at point $D)=p(GS$ at point $C)*f(\text{dev}_\Delta$ at point $D)$ $p(GS$ at point $D)=0.846*f(0.1)$ $p(GS$ at point $D)=0.846*2*\text{cdf}(-abs(0.1))=0.779$ These results are expected because the relative deviation away from the centerline 5030 is continuously increasing up to point D. In other words, the intention to go straight is getting smaller as the vehicle moves away from the centerline 5030. At point E, however, the vehicle deviates to the right, i.e., towards the centerline 5030. Accordingly, it is expected that the probability of going straight will increase. The probability at point E is updated as follows:

$p(GS$ at $E)=p(GS$ at point $D)/f(\text{dev}_\Delta$ at point $E)$ $p(GS$ at $E)=0.779/f(-0.15)$ $p(GS$ at $E)=0.779/(2*\text{cdf}(-abs(-0.15)))=0.884$ Point F represents a different situation from the analysis of the prior points as the vehicle crosses the centerline 5030. In this situation, the vehicle first moves toward the centerline 5030 of the lane 5000 and then moves away from the centerline 5030 of the lane 5000. To capture this dynamic, the line from point E to point F may be divided into two parts—one from point E to the centerline 5030 and the other from the centerline 5030 to point F. From point E to the centerline 5030, the probability increases as follows:

$p(GS$ at centerline$)=p(GS$ at point $E)/f(\text{dev}_\Delta$ at centerline$)$ $p(GS$ at centerline$)=0.884/f(-0.25)$ $p(GS$ at centerline$)=0.884/(2*\text{cdf}(-abs(-0.25)))=1.1$ A probability value is not greater than 1.0, so the value 1.1 is capped at 1.0 according to the following function:

$p(GS)=\min(1.0,p(GS))$

From the centerline 5030 to point F, the probability decreases as follows:

$p(GS$ at point $F)=p(GS$ at centerline$)*f(\text{dev}_\Delta$ from centerline to point $F)$ $p(GS$ at point $F)=1.0*f(-0.1)$ $p(GS$ at point $F)=1.0*2*\text{cdf}(-abs(-0.1))=0.92$ All probability values are rounded to no more than three decimal places, but a lesser or greater degree of precision may be used.

Similar reasoning can be used to update probability values in different scenarios. For example, when the vehicle is traveling on a two-lane road to the right side of the centerline, the probability of a right lane change, that is, a change into the right lane, is calculated as:

$p(RLC)=1-p(GS)$ where p(GS) is the probability of going straight; and the probability of a left lane change is calculated as:

$p(LLC)=0.$

When the vehicle is traveling on a two-lane road to the left side of the centerline, the probability of a left lane change, that is, a change into the left lane, is calculated as:

$p(LLC)=1-p(GS);$ and the probability of a right lane change is calculated as:

$p(RLC)=0.$

In another scenario, the vehicle is in an intersection. In this case, the probability values depend upon the number of lane options the vehicle has. For each lane, p(GS) is calculated using a respective centerline. Because the probability or likelihood of following each lane is calculated separately, the combined values would result in a likelihood of over 100%. Accordingly, the probabilities for each option are normalized with respect to the other options so as not to exceed a probability of 1.0, for example.

Referring again to FIG. 3, once the driving intention probabilities are calculated at 3040, processing advances to 3050 to generate a remote vehicle trajectory for up to N seconds. In some implementations, the trajectory is generated for up to 4 seconds. Other values for N may be specified by a user or operator.

Figure 6:
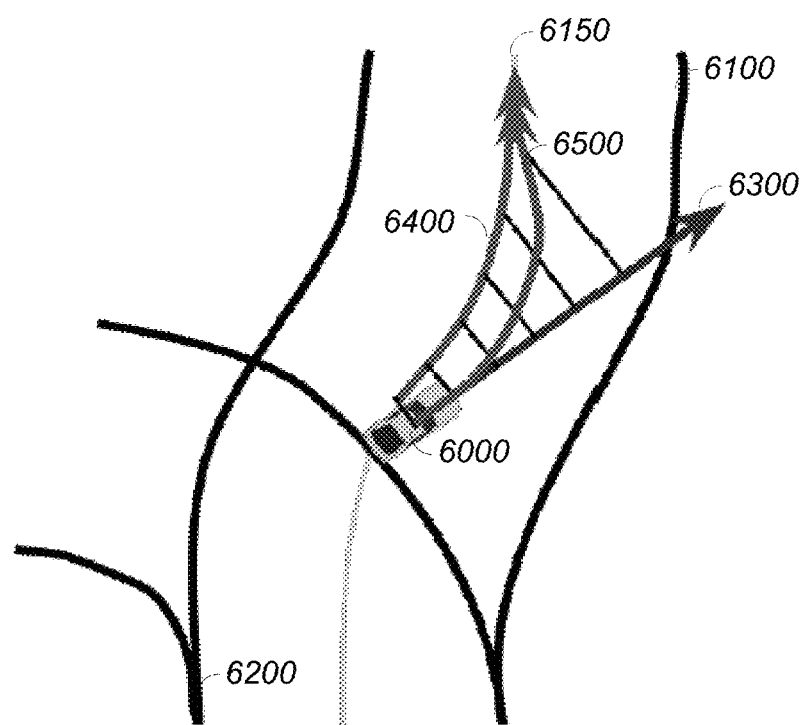
FIG. 6 is a diagram illustrating generation of the trajectory of the remote vehicle over time based on the weighted average of trajectories predicted based on velocity and map curvature.

FIG. 6 is a diagram illustrating generation of the trajectory of the remote vehicle over time based on the weighted average of trajectories predicted based on velocity and map curvature. FIG. 6 shows one lane 6100 and the trajectory for the vehicle 6000 when it follows the lane 6100, but calculations would be similar for other driving intentions (left turn, right turn, lane change, etc.).

The remote vehicle 6000 was most recently located at the point shown in FIG. 6 traveling in the lane 6100 from preceding lane 6200. The centerline 6150 of lane 6100 is also shown in FIG. 6. As is known, vehicle velocity is a vector having a heading and a magnitude. In FIG. 6, the predicted trajectory of the vehicle 6000 based on the vehicle velocity is shown extending over time by the arrow 6300. The vehicle velocity may be obtained from, for example, the remote vehicle kinetic state information optionally received in the process of FIG. 3 at 3000 or may be calculated, in whole or in part, from other information received at 3000. Knowing the velocity and the position of the remote vehicle 6000, the trajectory up to K seconds can be predicted.

FIG. 6 also illustrates a predicted trajectory that follows the curvature of the lane 6100. This predicted trajectory for up to K seconds shown by the arrow 6400 follows the centerline 6150 of lane 6100 using the speed of the vehicle 6000. The vehicle speed may be obtained from, for example, the remote vehicle kinetic state information optionally received in the process of FIG. 3 at 3000 or may be calculated, in whole or in part, from other information received at 3000. The arrow 6500 represents a trajectory of the vehicle 6000 that is a weighted average of the trajectory prediction based on the current velocity represented by the arrow 6300 and the trajectory prediction based on the map curvature represented by the arrow 6400.

Figure 7:
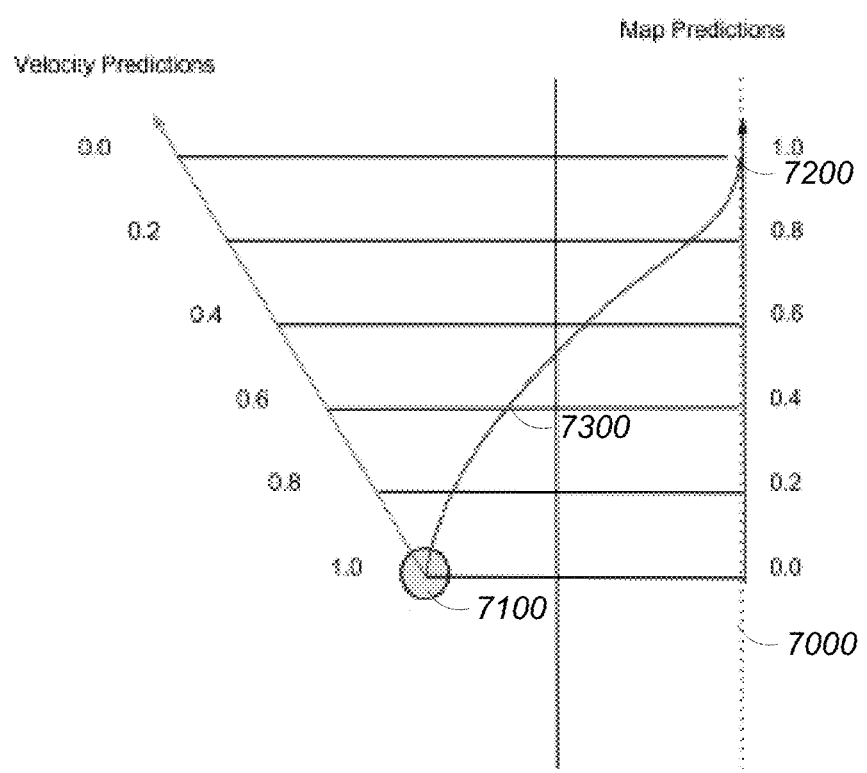
FIG. 7 is a diagram illustrating the weighting function that may be used for generating the trajectory of FIG. 6.

FIG. 7 is a diagram illustrating the weighting function that may be used for generating the trajectory of FIG. 6. The numbers and lines are arbitrary to illustrate the principals involved and do not represent values within FIG. 6. The numbers represent the weight given to each trajectory prediction over time. The weighting function is based on the assumption that, over time, the vehicle will move toward the centerline of the predicted lane as shown by the arrow 7000. That is, for example, the velocity predictions of trajectory are to the left in FIG. 7 and the map curvature predictions of trajectory are to the right in FIG. 7. At the current point 7100 at which the vehicle is located, the maximum weight (such as 1.0) is given to the velocity prediction of the trajectory and a minimal weight (such as 0) is given to the map curvature prediction of the trajectory. As time passes from the current point 7100, the weighting between the two predictions change such that the maximum weight is given to the map curvature prediction of the trajectory and the minimal weight is given to the velocity prediction of the trajectory at a future point 7200 at K seconds for example.

Various weighting functions may be used to perform the weighting. In one implementation, the weighting of the two predictions is performed using a cosine function. For example, the weight of the map predictions may follow the following equation:

$$0.5-0.5*\cos((2\pi/(2*\text{InterpolationTimeLength}))*t);$$
and the weight of the velocity predictions may follow the equation:

$$1-(0.5-0.5*\cos((2\pi/(2*\text{InterpolationTimeLength}))*t)).$$

The variable InterpolationTimeLength is equal to the length of time that the weight of map prediction changes from 0.0 to 1.0 or the weight of the velocity prediction changes from 1.0 to 0.0. This variable may be specified by a user. The variable t is equal to the length of time from the current time point to the interpolation point being calculated. Assuming, for example, that each horizontal line in FIG. 7 represents one second, such that the variable InterpolationTimeLength is 5 seconds, the weight applied the map prediction trajectory value $T_M$ at point 7300 would be:

$$0.5-0.5*\cos((2\pi/(2*5\text{ sec}))*2\text{ sec})=0.345;\text{ and}$$

the weight applied to the velocity prediction trajectory value $T_V$ at point 7300 would be:

$$1-0.345=0.655.$$

Thus, the weighted trajectory at point 7300 would be equal to:

$$0.345*T_M+0.655*T_V.$$

Similar calculations would result in a future trajectory for the remote vehicle at other time points.

Figure 8:
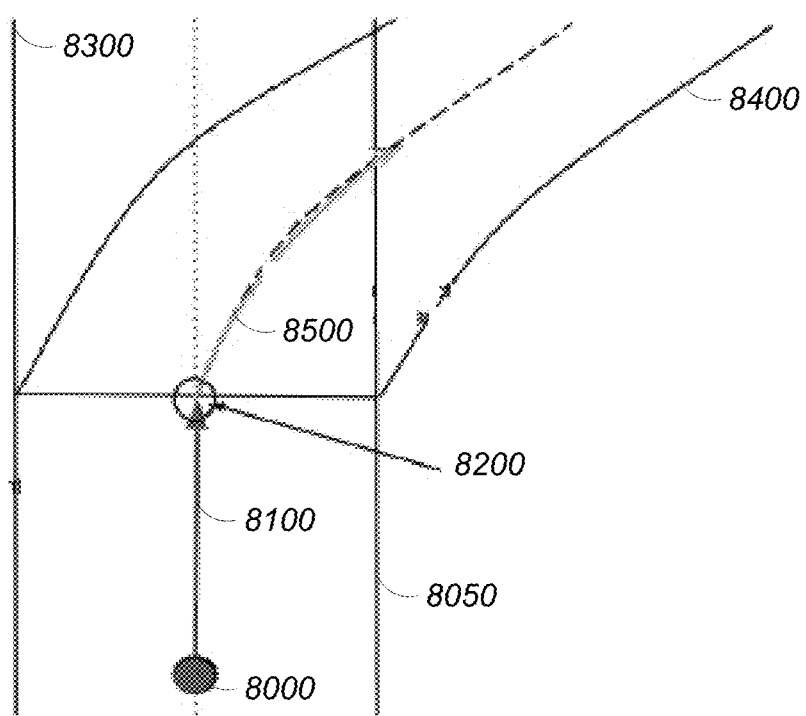
FIG. 8 is a diagram illustrating generating a trajectory of the remote vehicle over time.

As mentioned above, the trajectory may be calculated for up to K seconds in the future. The driving intention is an input into this process as seen in FIG. 8. More specifically, as the remote vehicle traverses the vehicle transportation network, it approaches changes in the vehicle transportation network information (e.g., lane changes) that must be taken into account in the generation of the remote vehicle trajectory. In FIG. 8, for example, the remote vehicle is at a current point 8000 on a single lane 8050 where the current driving intention can only be to go straight. An example of the trajectory for the remote vehicle is labeled 8100. Upon reaching point 8200, however, the driving intention may be go straight or right turn due to the presence of lanes 8300 and 8400. Assuming that the trajectory 8100 for the current intention of going straight only takes up 2 seconds of a 4-second trajectory calculation, the vehicle pose (i.e., its position within the vehicle transportation network information) and velocity is recalculated at point 8200 so as to generate the next segment of the trajectory, such as the trajectory 8500 for the next driving intention of right turn, for another 2 seconds. The trajectory is generated as described above with respect to FIGS. 6 and 7, and it is generated for each driving intention (e.g., lane).

Figure 9:
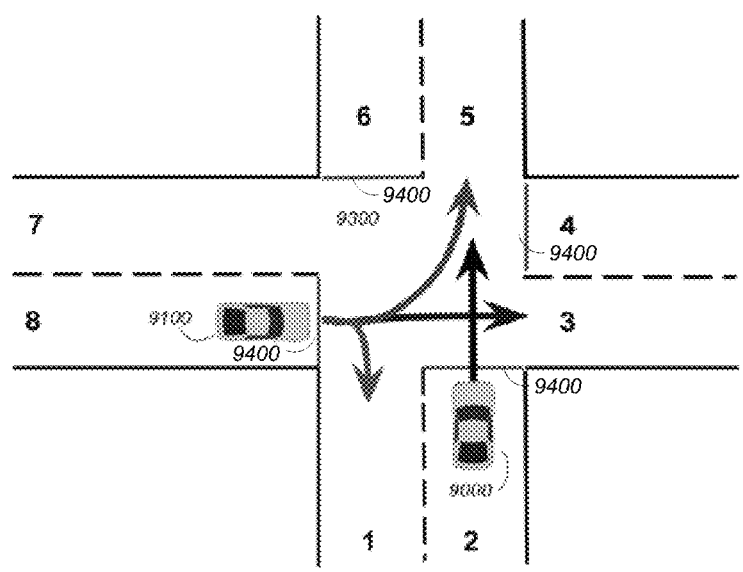
FIG. 9 is a diagram illustrating the host vehicle traversing the vehicle transportation network using the vehicle transportation network information and the trajectory for the remote vehicle.

Referring again to FIG. 3, once the remote vehicle trajectory is generated, it may be used to assist a host vehicle in traversing the vehicle transportation network. For example, and with reference to FIG. 9, the host vehicle 9000 and a remote vehicle 9100 are traveling within a portion of the vehicle transportation network, here an intersection 9300. The vehicle transportation network information includes lanes 1-8, and four stop signs, each represented by lines 9400. The host vehicle 9000 is located in lane 2, and will continue to lane 5 as shown by the arrow extending from the host vehicle 9000. The remote vehicle 9100 is lane 8, and can go straight or turn left or turn right as shown by the arrows extending from the remote vehicle 9100. The remote vehicle 9100 arrives at the stop sign of lane 8 before the host vehicle 9000 arrives at the stop sign of lane 2. In the described implementation, a lane change in the intersection 9300 is not included as a possible driving intention.

The host vehicle 9000 may make a decision regarding traversal of the intersection 9300, for example, based on the remote vehicle trajectory for lane and the likelihood that the remote vehicle 9100 will follow one driving intention or the other (i.e., go straight or left turn or right turn). For example, the host vehicle 9000 may decide to wait at the stop sign in lane 2 to let the remote vehicle 9100 pass the intersection 9300 if it is more likely than not that the remote vehicle 9100 will continue to lane 3, thus blocking the path of the host vehicle 9000 (e.g., the driving intention of go straight has a higher likelihood or probability than the driving intention of turn left and turn right). In contrast, the host vehicle 9000 might choose to make a brief stop and continue to go straight if it is more likely than not that the remote vehicle 9100 will turn right into lane 1 as the remote vehicle 9100 will not block the host vehicle 9000.

This is just one example, and the host vehicle 9000 may use the driving intentions and projected trajectories in any number of ways. For example, when both vehicles are traveling in the same lane on a straight road, the host vehicle 9000 may use the projected trajectory to determine if and when it will reach the remote vehicle 9100 to pass it. In another example, the remote vehicle 9100 may travel in a lane left of the host vehicle 9000 on a straight road. The host vehicle 9000 can then use the projected trajectory to determine if and when it should brake if the remote vehicle 9100 shows an intention of changing to the lane that the host vehicle 9000 is in. The host vehicle 9000 may also indirectly use the information generated for the remote vehicle 9100 by, for example, a network infrastructure device, such as a traffic controller at an intersection, receiving or generating the (e.g., remote and host) vehicle information and directing the intersection flow through traffic lights or otherwise using the trajectories and likelihoods.

Traversing the vehicle transportation network could involve actions such as issuing alarms to the driver of the host vehicle or taking corrective actions such as issuing braking instructions to a braking system of the host vehicle. Other corrective actions may be taken while the host vehicle is traversing the vehicle transportation network at 3060.

The method as described by example in FIG. 3 can be repeated periodically or on demand while the host vehicle is traveling along the vehicle transportation network. It can also be repeated in whole or in part when approaching changes in the lane configuration within the vehicle transportation network information.

Although the disclosure describes a single remote vehicle as the tracked object, other motorized vehicles that maintain positions within a defined lane may also be tracked. Further, more than one remote vehicle may be tracked over time. The above includes at most three lanes diverging from the same predecessor lane at an intersection—a straight lane, a left turn lane and a right turn lane. Further complexity is introduced into the calculations when additional lanes are introduced or when lane changes within an intersection can occur.

The above aspects, examples and implementations have been described in order to allow easy understanding of the disclosure are not limiting. On the contrary, the disclosure covers various modifications and equivalent arrangements included within the scope of the appended claims, which scope is to be accorded the broadest interpretation so as to encompass all such modifications and equivalent structure as is permitted under the law.

What is claimed is:

1. A method of generating projected vehicle information for use in traversing a vehicle transportation network, the method comprising:
    receiving, by at least one of a sensor or an electronic communication interface of a host vehicle, remote vehicle spatial state information for a remote vehicle;
    identifying vehicle transportation network information representing a portion of the vehicle transportation network based on the remote vehicle spatial state information;
    generating, by a processor in response to instructions stored on a non-transitory computer readable medium, at least one initial probability value based on a comparison of the remote vehicle spatial state information and the vehicle transportation network information at an initial time point, each initial probability value indicating a likelihood that the remote vehicle is following a single lane within the vehicle transportation network information;
    generating, for a plurality of time points including the initial time point forming a period of time, a deviation of the remote vehicle between adjacent values for the remote vehicle spatial state information relative to the vehicle transportation network information;
    generating, for each single lane and for each deviation, a new probability value that corresponds to the deviation;
    updating, for each single lane and for each deviation, the likelihood that the remote vehicle is following the single lane by modifying a previous probability value at a previous time point of the plurality of time points, starting with the initial probability value, using the new probability value of a current time point;
    generating, for the remote vehicle, a trajectory using the likelihood as updated; and
    traversing, by the host vehicle, the vehicle transportation network using the vehicle transportation network information and the trajectory for the remote vehicle.

2. The method of claim 1, wherein identifying vehicle transportation network information representing a portion of the vehicle transportation network based on the remote vehicle spatial state information comprises:
    identifying at least one lane that the remote vehicle may traverse by comparing the remote vehicle spatial state information with the vehicle transportation network.

3. The method of claim 2, further comprising:
    receiving, at the host vehicle, remote vehicle kinematic state information for the remote vehicle over the period of time; and wherein
    generating the trajectory using the likelihood as updated comprises generating the trajectory using the remote vehicle kinematic state information.

4. The method of claim 3, wherein the remote vehicle spatial state information includes spatial coordinates for the remote vehicle, and the remote vehicle kinematic state information includes at least one of a remote vehicle velocity for the remote vehicle or a remote vehicle acceleration for the remote vehicle.

5. The method of claim 1, further comprising:
    receiving, at the host vehicle, remote vehicle kinematic state information for the remote vehicle over the period of time; and wherein
    generating the trajectory using the likelihood as updated comprises:
    generating, for each specific lane, a respective trajectory to form a plurality of trajectories projected out from a current position of the remote vehicle using the remote vehicle kinematic state information, the plurality of trajectories extending into a same future point in time.

6. The method of claim 1, wherein generating the at least one initial probability value comprises:
    comparing the remote vehicle spatial state information and the vehicle transportation network information to define a current number of lanes available to the remote vehicle within the vehicle transportation network information at the initial time point; and wherein
    each initial probability value is generated using the current number of lanes.

7. The method of claim 1, wherein generating the trajectory using the likelihood as updated comprises:
    generating a set of first trajectory values using a current velocity and heading of the remote vehicle;
    generating a set of second trajectory values using the likelihood as updated; and
    generating the trajectory by combining the set of first trajectory values and the set of second trajectory values.

8. The method of claim 7, wherein combining the set of first trajectory values and the set of second trajectory values comprises:
    applying a cosine function to weight each first trajectory value of the set of first trajectory values with a respective second trajectory value of the set of second trajectory values at an end of each of a plurality of time intervals for an interpolation time.

9. The method of claim 1, wherein the single lane is one of a plurality of lanes, the method further comprising, for each lane of the plurality of lanes:
    defining a centerline for the lane; and
    for each current time point of the plurality of time points:
    receiving a current value for the remote vehicle spatial state information, the current value associated with a current position of the remote vehicle at the current time point; and one of:
    projecting a centerline of the remote vehicle in parallel with the centerline for the lane from a previous value for the remote vehicle spatial state information to a Euclidean line extending between the current value for the remote vehicle spatial state information and the centerline; and
    generating the deviation as a relative deviation of the remote vehicle from the centerline for the lane based on a Euclidean distance between the current value for the remote vehicle and the centerline of the remote vehicle on the Euclidean line; or
    projecting a centerline of the remote vehicle in parallel with the centerline for the lane from a Euclidean line extending between a previous value for the remote vehicle spatial state information and the centerline to the current value for the remote vehicle spatial state information; and generating the deviation as a relative deviation of the remote vehicle from the centerline for the lane based on a Euclidean distance between the previous value for the remote vehicle and the centerline of the remote vehicle on the Euclidean line;

wherein the new probability value is based on the relative deviation.

10. The method of claim 9, wherein updating the initial probability value using the new probability value based on the relative deviation further comprises:

relating the relative deviation to the new probability value using a cumulative distribution function of a Gaussian distribution.

11. A method of generating projected vehicle information for use in traversing a vehicle transportation network, the method comprising:

receiving, at a host vehicle, remote vehicle spatial state information for a remote vehicle;

identifying vehicle transportation network information representing a portion of the vehicle transportation network based on the remote vehicle spatial state information;

generating, by a processor in response to instructions stored on a non-transitory computer readable medium, at least one probability value based on a comparison of the remote vehicle spatial state information and the vehicle transportation network information at an initial time point, each probability value associated with a respective lane within the vehicle transportation network information indicating a likelihood that the remote vehicle is following the lane within the vehicle transportation network information;

for each of a plurality of time points after the initial time point and for each lane within the vehicle transportation network information:

generating a deviation between a current position of the remote vehicle relative to a centerline of the lane at a current time point and a previous position of the remote vehicle at a preceding time point relative to the centerline of the lane;

determining a probability of deviation from the previous position based on the deviation;

updating the probability value for the previous time point using the probability of deviation to obtain the probability value for the current time point;

generating, for the remote vehicle, a trajectory using the probability value for the current time point; and traversing, by the host vehicle, the vehicle transportation network using the vehicle transportation network information and the trajectory for the remote vehicle.

12. The method of claim 11, wherein updating the probability value comprises:

generating the probability value for the current time point by dividing the probability value for the previous time point by the probability of deviation when the remote vehicle is closer to the centerline at the current time point than at the previous time point but did not cross the centerline between the previous time point and the current time point;

generating the probability value for the current time point by multiplying the probability value for the previous time point by the probability of deviation when the remote vehicle is further away from the centerline at the current time point than at the previous time point but did not cross the centerline between the previous time point and the current time point; and when the remote vehicle crossed the centerline between the previous time point and the current time point, generating the probability value for the current time point by:

dividing, to generate a product, the previous probability value for the previous time point by a first probability value based on a portion of the deviation attributable to the remote vehicle traveling from the previous position at the previous time point to the centerline; and multiplying, to generate the probability value for the current time point, the product by a second probability value based on a portion of the deviation attributable to the remote vehicle traveling from the centerline to a current position at the current time point.

13. The method of claim 11, wherein:

the deviation is a positive value when the remote vehicle is moving in a first direction relative to a centerline of the lane; and the deviation is a negative value when the remote vehicle is moving in a second direction relative to the centerline of the single lane, the second direction being opposite to the first direction.

14. An apparatus for generating projected vehicle information for use in traversing a vehicle transportation network, the apparatus comprising:

a non-transitory memory; and a processor configured to execute instructions stored in the non-transitory memory to:

receive remote vehicle spatial state information for a remote vehicle;

identify vehicle transportation network information representing a portion of the vehicle transportation network based on the remote vehicle spatial state information;

generate at least one initial probability value based on a comparison of the remote vehicle spatial state information and the vehicle transportation network information at an initial time point, each initial probability value indicating a likelihood that the remote vehicle is following a single lane within the vehicle transportation network information;

generate, for a plurality of time points including the initial time point that forms a period of time, a deviation of the remote vehicle between adjacent values for the remote vehicle spatial state information relative to the vehicle transportation network information;

generate, for each single lane and for each deviation, a new probability value that corresponds to the deviation;

update, for each single lane and for each deviation, the likelihood that the remote vehicle is following the single lane by modifying a previous probability value at a previous time point of the plurality of time points, starting with the initial probability value, using the new probability value of a current time point;

generate, for the remote vehicle, a trajectory using the likelihood as updated; and traverse, using a host vehicle, the vehicle transportation network using the vehicle transportation network information and the trajectory for the remote vehicle.

15. The apparatus of claim 14, wherein the processor is configured to identify the vehicle transportation network information representing a portion of the vehicle transportation network based on the remote vehicle spatial state information by:
identifying a plurality of lanes, each of the plurality of lanes being one of:
a current lane on which the remote vehicle is traveling at the initial time point;
an adjacent lane adjacent to the current lane;
a previous lane occurring before the current lane; or
a future lane occurring after the current lane.

16. The apparatus of claim 14, wherein the processor is configured to:
receive remote vehicle kinematic state information for the remote vehicle over the period of time; and
generate the trajectory using the likelihood as updated by generating the trajectory using the remote vehicle kinematic state information.

17. The apparatus of claim 16, wherein the processor is configured to receive the remote vehicle kinematic state information within a wireless signal transmitted from the remote vehicle.

18. The apparatus of claim 16, wherein the processor is configured to receive the remote vehicle kinematic state information using at least one of a sensor or an electronic communication interface of the host vehicle.

19. The apparatus of claim 14, wherein the processor is configured to generate the at least one initial probability value by:
comparing the remote vehicle spatial state information and the vehicle transportation network information to define a current number of lanes available to the remote vehicle within the vehicle transportation network information at the initial time point; wherein
each initial probability value is equal to one divided by the current number of lanes; and wherein
the current number of lanes is greater than one.

20. The apparatus of claim 19, wherein the processor is configured to generate respective values for the deviation for each lane and is configured to update the likelihood using the new probability value, for each lane, by:
generating a current probability value for a current time point of the plurality of time points by dividing a previous probability value for a previous time point within the plurality of time points by the new probability value when the remote vehicle is closer to a centerline of the lane at the current time point than at the previous time point but did not cross the centerline between the previous time point and the current time point;
generating the current probability value for the current time point of the plurality of time points by multiplying the previous probability value for the previous time point within the plurality of time points by the new probability value when the remote vehicle is further away from the centerline at the current time point than at the previous time point but did not cross the centerline between the previous time point and the current time point; and
when the remote vehicle crossed the centerline between the previous time point and the current time point, generating the current probability value for the current time point of the plurality of time points by:
dividing, to generate a product, the previous probability value for the previous time point within the plurality of time points by a first probability value based on a portion of the deviation attributable to the remote vehicle traveling from a starting position at the previous time point to the centerline; and
multiplying, to generate the current probability value, the product by a second probability value based on a portion of the deviation attributable to the remote vehicle traveling from the centerline to a current position at the current time point.

21. The apparatus of claim 20, wherein the processor is configured to normalize the current probability value at each of the plurality of time points based on the current number of lanes before generating the trajectory for each lane.

* * * * *